Sept. 9, 1941  E. TIMIAN ET AL  2,255,573
ADJUSTABLE MILK-STRAINER HOLDER
Filed Feb. 5, 1940
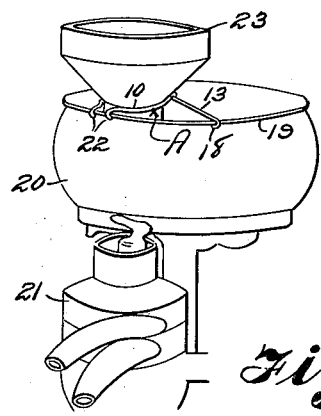
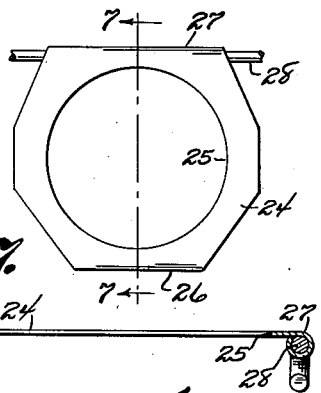
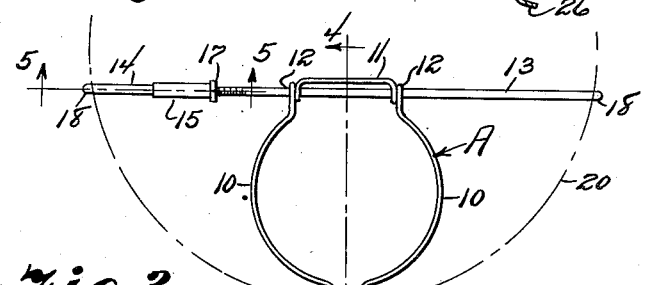
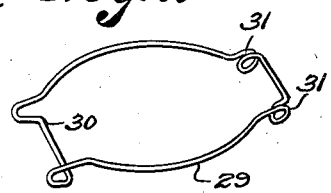
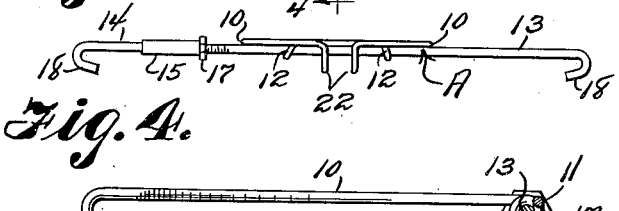
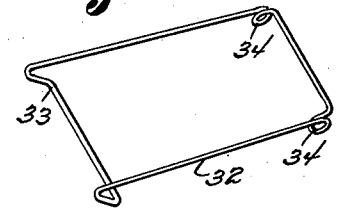
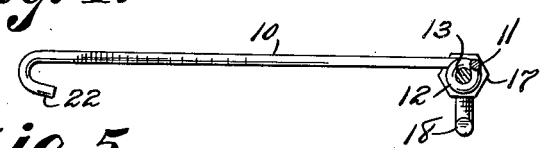
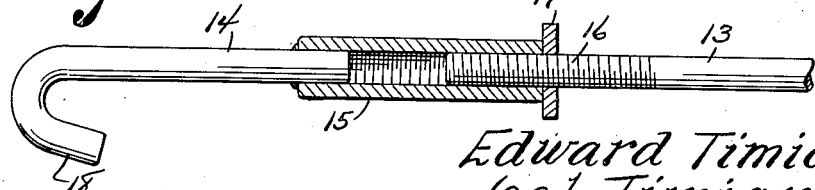
Edward Timian
Joel Timian
INVENTORS
BY Victor J. Evans & Co.
WITNESS  ATTORNEYS Patented Sept. 9, 1941

2,255,573

UNITED STATES PATENT OFFICE 2,255,573

ADJUSTABLE MILK-STRAINER HOLDER

Edward Timian and Joel Timian, Dresden, N. Dak.

Application February 5, 1940, Serial No. 317,420

3 Claims. (Cl. 248—94)

The invention relates to an adjustable holder and more especially to an adjustable milk-strainer holder.

The primary object of the invention is the provision of a holder of this character wherein a milk strainer or the like can be conveniently held thereby in proper position or in association with a cream separator or the like apparatus and such holder is susceptible of being shifted when engaged upon the separator so as to position the strainer at the desired locality with relation to the tank or bowl of such separator while ready access may be had to the latter, there being no liability of the strainer accidentally tipping or falling from the tank or bowl during the use of the holder.

Another object of the invention is the provision of a holder of this character wherein the same is susceptible of adjustment so as to fit different sizes of bowls or cream separator tanks and when engaged therewith will cling to the same, the holder being sanitary because of it not having any pieces in which dirt and germs may collect and is susceptible of being readily cleaned or washed.

A further object of the invention is the provision of a holder of this character wherein the construction thereof is novel in its entirety and may be clamped firmly to a tank or bowl of a milk separator or like machine and when so clamped will securely hold a milk strainer to one side of the center of the bowl or tank of the cream separator or the like and thereby conveniently locating the said strainer for service and also enabling easy access to the interior of the bowl or tank of such separator.

A still further object of the invention is the provision of a holder of this character, which is simple in its construction, thoroughly reliable and efficient in operation, readily and easily applied to and removed from a bowl or tank and when applied will sustain a strainer in proper position for service and eliminates the possibility of the accidental displacement thereof.

With these and other objects in view, the invention consists in the features of construction, combination and arrangement of parts as will be hereinafter more fully described in detail, illustrated in the accompanying drawing, which discloses the preferred and modified forms of embodiment of the invention and pointed out in the claims hereunto appended.

In the accompanying drawing:

Figure 1 is a fragmentary perspective view of a cream separator of conventional construction showing applied to its tank or bowl the holder constructed in accordance with the invention and supporting a milk strainer of standard type.

Figure 2 is a top plan view of the holder applied to the bowl or tank of the separator with the strainer removed.

Figure 3 is an elevation of the holder detached from the separator.

Figure 4 is a fragmentary sectional view taken on the line 4—4 of Figure 2 looking in the direction of the arrows.

Figure 5 is an enlarged sectional view taken on the line 5—5 of Figure 2 looking in the direction of the arrows.

Figure 6 is a fragmentary plan view of a modified form of holder.

Figure 7 is an enlarged sectional view taken on the line 7—7 of Figure 6 looking in the direction of the arrows.

Figures 8 and 9, respectively, are perspective views of several further modified forms of holder.

Similar reference characters indicate corresponding parts throughout the several views in the drawing.

Referring to the drawing in detail, particularly Figures 1 to 5, inclusive, the holder constituting the preferred embodiment of the invention is denoted generally at A and comprises a supporting frame made from a single length of stiff wire bent on itself to provide outwardly curved side limbs or arms 10. These side limbs or arms 10 are continuations of an intermediate joining portion 11 and in its extent is straight and includes spaced coils forming eyes 12 for releasably accommodating a sectional bridge piece or sectional clamp, the sections of which are denoted at 13 and 14, respectively. The section 14 is built with an internally threaded coupling sleeve 15 in which is adjustably fitted the threaded end 16 of the section 13 and coacting with the sleeve 15 is a lock or jamb nut 17, being threaded upon the end 16 of the section 13 so as to sustain both sections 13 and 14 in their adjusted relation to each other. The sections 13 and 14 are provided with outer hooklike jaws 18, which engage with an outwardly curled rim 19 of a tank or bowl 20, being an accessory of a cream separator or the like machine, a portion of the same being indicated at 21. The side limbs or arms 10 at their separated free ends remote from the portion 11 are formed with hooklike jaws 22 corresponding to the jaws 18. These jaws 22 are adapted to engage with the rim 19 of the tank or bowl 20 and in this manner the holder is hung upon the said tank or bowl or clamped thereon for accommodating a milk strainer 23, being of conventional form for the association of the latter with the tank or bowl 20 as is clearly disclosed in Figure 1 of the drawing. This holder when supporting the strainer 23 and clamped to the bowl or tank 20 sustains the said strainer 23 supported to one side of the center of said bowl or tank so that ready access may be had to the interior of the latter and also such strainer located for convenient service thereof. There is no possibility of the knocking of the strainer 23 or the pushing of the same out of the bowl or tank 20 when within the holder and this strainer is maintained in a workable position in its association with the separator 21.

The sections 13 and 14 of the bridge piece or hanger are susceptible of ready adjustment so as to accommodate itself to different sizes or diameters of bowls or tanks as may be the case in the use of different makes of separators or like machines.

The holder when engaged upon the bowl or tank 20 can be moved in a rotary path and thus placing the strainer 23 when therein at the desired location most convenient to the user thereof when in association with the separator.

In Figures 6 and 7 of the drawing there is shown a slight modification of the invention wherein the frame 24 of the holder for the strainer is made from a single piece of sheet material, preferably metal, having a central opening 25 therein for the interfitting therewith of the strainer hereinbefore mentioned. This frame 24 at one point thereof is formed with a jaw 26 bent therefrom while diametrically opposite the jaw is an eye formation 27 for the bridge piece or hanger, a portion thereof being indicated at 28 and is identical in its construction to the piece or hanger involving the sections 13 and 14 hereinbefore described.

In Figure 8 of the drawing there is shown another modification of the invention wherein the frame 29 has at a closed end thereof a jaw formation 30 while at an opposite closed end thereof are the eyes 31 spaced from each other and similar to the eyes 12. These eyes 31 accommodate the piece or hanger while the jaw 30 functions similarly to the jaws 22 and 26, respectively. The frame 29 is constituted by a single piece of stiff wire.

In Figure 9 of the drawing there is shown a further modification wherein the frame 32 is of substantially rectangular shape having at one end the jaw 33 and at the other end the eyes 34, respectively.

In the use of the preferred and modified forms of construction hereinbefore set forth, the holder involved is applied in a manner as clearly illustrated in Figure 1 of the drawing and the purpose and use as well as the advantages of such holder have been heretofore indicated.

What is claimed is:

1. A strainer holder for a cream separator having a bowl, comprising a frame formed of a single piece of wire adapted to embrace a strainer and having on one side spaced eyes and on the opposite side spaced bowl engaging portions, and a sectional bridge piece accommodated within the eyes of said frame and adapted to be clamped in engagement with the edge of said bowl.

2. A strainer holder for a cream separator having a bowl, comprising a frame formed of a single piece of wire adapted to embrace a strainer and having on one side spaced eyes and on the opposite side spaced bowl engaging portions, and a sectional bridge piece accommodated within the eyes of said frame and having hooked ends adapted to be clamped over the edge of the bowl, and a threaded connection between the sections of said bridge piece.

3. A strainer holder for a cream separator having a bowl, comprising a frame formed of wire adapted to embrace a strainer and having on one side spaced eyes and on the opposite side spaced bowl engaging portions, and a bridge piece accommodated within the eyes of the frame and adapted to be clamped in engagement with the edge of said bowl.

EDWARD TIMIAN.
JOEL TIMIAN.